Feb. 24, 1925. 1,527,675
W. DUNN ET AL
IMPLEMENT FOR SOWING SEED
Filed May 25, 1921   2 Sheets-Sheet 2

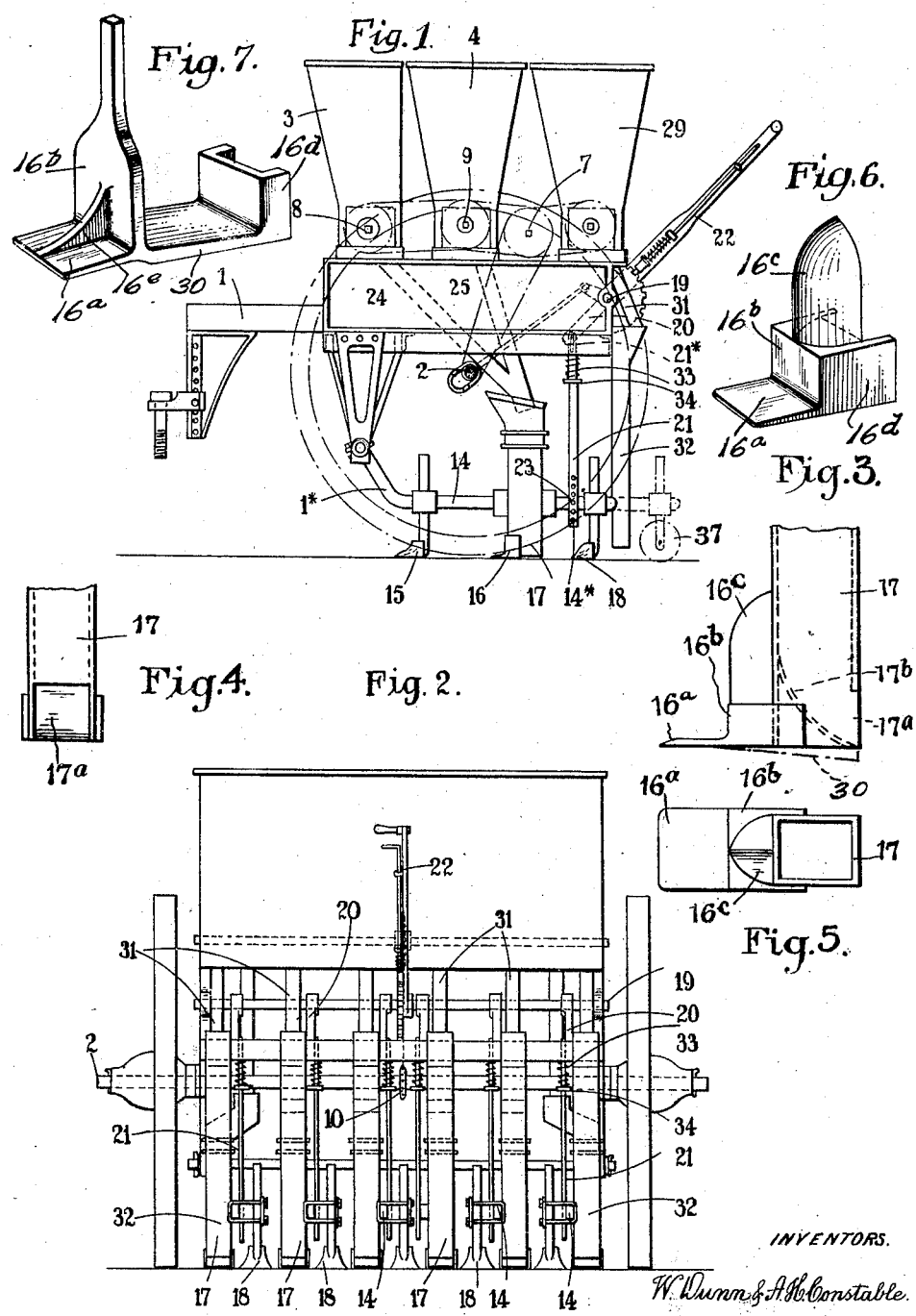

INVENTORS.
W. Dunn & A. H. Constable.
per Robert E. Phillips
Attorney.

Patented Feb. 24, 1925.

1,527,675

UNITED STATES PATENT OFFICE.

WALTER DUNN, OF CANTERBURY, AND ARTHUR HOPE CONSTABLE, OF PENSHURST, ENGLAND.

IMPLEMENT FOR SOWING SEED.

Application filed May 25, 1921. Serial No. 472,588.

*To all whom it may concern:*

Be it known that we, WALTER DUNN, residing at 10, St. Margaret Street, Canterbury, in the county of Kent, England, and ARTHUR HOPE CONSTABLE, residing at The Quarry, Penshurst, in the county aforesaid, both subjects of the King of Great Britain and Ireland, have invented a new and useful Improvement in Implements for Sowing Seeds, of which the following is a full and complete specification.

This invention relates to implements for sowing the seed of cereals and other agricultural produce and it has for its objects to form a smooth and even bed for the seed so as to ensure that all the seed is planted at a uniform depth. A further object of the invention is to effect the sowing so as to produce larger crops and to econmize in the use of seed and fertilizers.

With these and other objects in view the invention comprises the various novel features of construction, combination and arrangement of parts hereinafter fully described and illustrated in the accompanying drawing and pointed out in the claims hereto appended.

Figure 6:
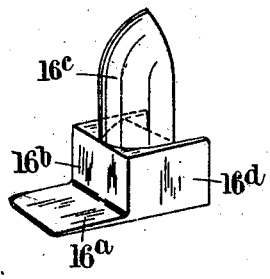

Figures 1 and 2 are views in side and end elevations showing the application of this invention. Figures 3, 4 and 5 are views in side elevation, rear elevation and plan—on an enlarged scale—showing the improved hoe. Figure 6 is a view in perspective of the hoe shown in Figures 3, 4 and 5, and Figure 7 is a view in perspective of a modified form of said hoe.

On a frame 1 is mounted in suitable bearings a transverse axle 2 on the ends of which are mounted the traveling wheels which are each coupled to said axle by any suitable form of one-way driving clutch. On the top of the frame 1 are mounted the seed and fertilizer hoppers 3 and 4 which are provided with rotary distributors which may be of any suitable type. In a suitable position in relation to the axle 2 and to the distributors is a countershaft 7 which is geared to the axles 8 and 9 of the distributors by sprockets and chains or other suitable gearing. The countershaft 7 is driven from the axle 2 by sprocket and chain gearing the sprocket 10 of said gearing on the axle 2 being coupled to said axle by means of a positive action clutch.

Figure 7:
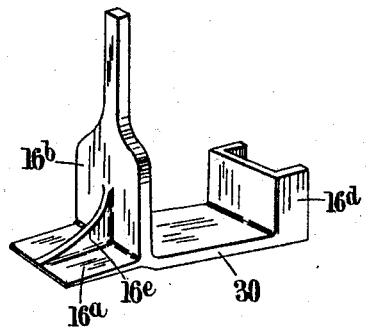

Onto the frame 1 is pivoted at or near its forward end a sub-frame 1* which consists of a number of bars 14 each of which carries a hoe 15 for forming a furrow or for turning up a ridge according to the manner in which the seed is to be sown, a hoe 16 for leveling and smoothing the bottom of said furrow by filling in any inequalities left by the hoe 15, a spout 17 connected to the hoppers 3 and 4 for distributing the seed and the fertilizer, and a hoe 18 for turning back the soil into the furrow to cover up the seed. For heavy land it may be desirable to consolidate the seed bed formed by the hoe 16 to which end plate 20 may be arranged to follow said hoe and can conveniently be mounted on the bottom both of said hoe and of the adjacent seed spout as shown in Figure 7. Mounted in suitable bearings carried by the main frame 1 is a shaft 19 which carries a series of arms or levers 20 which are connected to the bars 14 of the sub-frame 13 by adjustable links 21. On the shaft 19 is fixed a hand lever 22 for the purpose of simultaneously raising and lowering the elements of said sub-frame, said lever being provided with adjustable locking means such as a trigger co-acting with a fixed notched quadrant. The links 21 are adjustably attached to the bars 14 by means of pins 23 and a plurality of holes 14* in the bars 14 and are connected to the arms or levers 20 by springs connections which will allow the individual bars to rise independently of the others in case they should meet obstructions. A convenient construction is to connect the link to its arms or lever 20 by means of a slot 21* and to mount a spring 33 on said link which operates between a collar 34 thereon and any suitable fixed abutment.

The hoppers 3 and 4 are each connected with the series of spouts 17 by means of shoots 24 and 25 which are so shaped and arranged that their lower ends lead into said spouts 17 in any position said spouts can assume.

The hoes 15 and 18 are so mounted on the bar 14 that they can be easily and readily mounted or disconnected and so that they can be located on either side of said bar and at any height with respect thereto. The spout 17 is also so mounted that its position relative to the hoes in the vertical plane can be varied. The levelling and smoothing hoe 16 consists essentially of a horizontally disposed plate 16ª, the front edge of which is substantially straight so as to operate as a cutting edge, and a vertically disposed plate 16ᵇ, located at the rear edge of the horizontally disposed plate 16ª, and of the same width as said plate 16ª, the function of said vertically disposed plate being to collect the soil gathered by the horizontally disposed plate and push it forward over the front edge of the horizontal plate and thus provide material for filling up any inequalities in the bed of the furrow. The vertically disposed plate 16ᵇ, is either wholly flat i. e. is straight in both the vertical and horizontal planes as shown in Figure 7 or partially flat and partially cone or wedge shaped as shown in Figs. 3, 5 and 6, the lower part, 16ᵇ being flat and the upper part 16ᶜ being bent or otherwise fashioned to give it a cone or wedge shape for the purpose of allowing the superfluous heaped up soil on the plate 16ª to pass to the sides of the hoe as is usual with hoes of the ordinary shape. The hoe 16 may conveniently be mounted on the seed spout as shown in Figs. 1, 3, 5 and 7, in which case the vertically disposed plate 16ᵇ is provided with side plates or flanges 16ᵈ by which it can be secured to said spout. To stiffen the plates 16ª and 16ᵇ a centrally arranged web 16ᵉ may be provided as shown in Fig. 7.

The spout 17 has an opening 17ª on its rear side and preferably has its lower end closed by a curved plate 17ᵇ as shown in Fig. 3 but this is not obligatory.

It will be understood that both the forward and the rear hoes may be arranged to operate either solely in conjunction with the seed spout carried on the same bar or partly in conjunction with said spout and partly in conjunction with the adjacent spout on either side of it.

For the purpose of giving the sown seed some protection against depredation by birds, mice and other animals a third hopper 29 with shoot 31 and spout 32 may be provided and located behind the hoe 18 as shown in Figure 1.

It will be understood that the sub-frame 1* may carry any number of bars 14 according to the number of rows of seed the implement is intended to sow.

The seed distributor 5 is preferably fitted with an agitator 35 driven from the countershaft either directly or indirectly through the axle of the distributor through chain or other suitable gearing.

By a suitable adjustment of the elements carried by the sub-frame this implement may be used for all tilling operations subsequent to ploughing.

With an implement according to the present invention the sowing of the seed at a uniform depth is insured by the use of the levelling hoe of the special form hereinbefore described, either with or without a pressure roller according to the nature of the soil, which operates to leave the bottom of the seed drill or furrow flat and smooth i. e. without any holes or depressions or irregularities.

What we claim is:—

1. In an implement for sowing the seed of cereals and other agricultural produce, a hoe for levelling the bottom of the furrow forming the seed bed comprising a flat horizontally disposed plate and a vertically disposed plate at the rear end of said horizontal plate said vertical plate being flat and of the same width as the horizontal plate.

2. For a seed drill, a hoe comprising a flat horizontally disposed plate and a vertically disposed plate at the rear of the horizontal plate said vertical plate being flat at its lower part and cone shaped at its upper part.

3. For a seed drill, a hoe comprising a flat horizontally disposed plate having its front edge substantially straight and a vertically disposed plate at the rear edge of said horizontal plate said vertical plate having a flat face at its lower part and an angular face at its upper part both said parts being of the same width as the horizontal plate.

WALTER DUNN.
ARTHUR HOPE CONSTABLE.